(12) United States Patent
Lee et al.

(10) Patent No.: US 11,686,600 B2
(45) Date of Patent: Jun. 27, 2023

(54) APPARATUS WITH ROTOR INPUT DETECTION, AND ELECTRONIC DEVICE INCLUDING APPARATUS WITH ROTOR INPUT DETECTION

(71) Applicant: SAMSUNG ELECTRO-MECHANICS CO., LTD., Suwon-si (KR)

(72) Inventors: Gye Won Lee, Suwon-si (KR); Hong Seok Lee, Suwon-si (KR); Hee Sun Oh, Suwon-si (KR); Chang Ju Lee, Suwon-si (KR); Mun Sun Jung, Suwon-si (KR); Jong Yun Kim, Suwon-si (KR); Si Young Kwon, Suwon-si (KR); Yong Wook Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 100 days.

(21) Appl. No.: 17/488,468

(22) Filed: Sep. 29, 2021

(65) Prior Publication Data
US 2023/0003553 A1    Jan. 5, 2023

(30) Foreign Application Priority Data
Jun. 30, 2021   (KR) .................. 10-2021-0085944

(51) Int. Cl.
*G01D 5/20* (2006.01)
*G01D 5/24* (2006.01)
(Continued)

(52) U.S. Cl.
CPC ............. *G01D 5/20* (2013.01); *G01D 5/24* (2013.01); *G06F 3/04883* (2013.01)

(58) Field of Classification Search
CPC ........ G01R 27/00; G01R 27/02; G01R 27/26; G01R 27/2605; G01D 5/00; G01D 5/12;
(Continued)

(56) References Cited

U.S. PATENT DOCUMENTS

2006/0102777 A1* 5/2006 Rock ................. B64C 27/10
                                                           244/17.25
2017/0097370 A1* 4/2017 Steinert ............ G01N 35/10
(Continued)

FOREIGN PATENT DOCUMENTS

CH        634920 A5 * 2/1983  ............ G01N 21/07
CN       1657878 A  * 8/2005  ............ G01D 5/202
(Continued)

*Primary Examiner* — Hoai-An D. Nguyen
(74) *Attorney, Agent, or Firm* — NSIP Law

(57) ABSTRACT

An apparatus with rotor input detection includes: a first reactance element disposed at a rotor configured such that at least a part of the rotor rotates around a rotation axis, and disposed at the rotor such that reactance of the first reactance element varies depending on relative rotation between a first portion of the rotor and a second portion of the rotor; and a second reactance element disposed at the rotor such that reactance of the second reactance element varies depending on a contact or a force applied to a side surface of the rotor. The first and second reactance elements are configured to detect inputs of different areas of the rotor.

19 Claims, 14 Drawing Sheets

(51) Int. Cl.
*G06F 3/0488* (2022.01)
*G06F 3/04883* (2022.01)

(58) Field of Classification Search
CPC .......... G01D 5/14; G01D 5/20; G01D 5/2006;
G01D 5/202; G01D 5/24; G01D 5/241;
G01D 5/2417; G01D 5/243; G06F 3/00;
G06F 3/01; G06F 3/048; G06F 3/0487;
G06F 3/0488; G06F 3/04883
USPC .......................................... 324/600, 649, 652
See application file for complete search history.

(56) References Cited

U.S. PATENT DOCUMENTS

2019/0258395 A1    8/2019  Balaram
2023/0003799 A1*   1/2023  Lee ........................... H02P 6/16

FOREIGN PATENT DOCUMENTS

DE             10159110 A1 *   6/2003    ............... G01D 3/10
JP             2007-80778 A        3/2007
KR             2011016573 A *   2/2011    ............. H02K 29/06
KR      10-2017-0085826 A        7/2017
KR      10-2018-0127454 A       11/2018

* cited by examiner

APPARATUS WITH ROTOR INPUT DETECTION, AND ELECTRONIC DEVICE INCLUDING APPARATUS WITH ROTOR INPUT DETECTION

CROSS-REFERENCE TO RELATED APPLICATIONS

This application claims the benefit under 35 U.S.C. § 119(a) of Korean Patent Application No. 10-2021-0085944 filed on Jun. 30, 2021 in the Korean Intellectual Property Office, the entire disclosure of which is incorporated herein by reference for all purposes.

BACKGROUND

1. Field

The following description relates to an apparatus for detecting different inputs of a rotor, and an electronic device including an apparatus for detecting different inputs of a rotor.

2. Description of the Background

Recently, types and designs of electronic devices have become diverse. In addition, the diversity of demands of electronic device users is increasing. As this diversity is increasing, requirements for functions and designs of electronic devices are becoming more diverse.

Accordingly, an electronic device may include a rotor to perform various functions desired by users, based on efficient movement and design of the rotor.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an apparatus with rotor input detection includes: a first reactance element disposed at a rotor configured such that at least a part of the rotor rotates around a rotation axis, and disposed at the rotor such that reactance of the first reactance element varies depending on relative rotation between a first portion of the rotor and a second portion of the rotor; and a second reactance element disposed at the rotor such that reactance of the second reactance element varies depending on a contact or a force applied to a side surface of the rotor. The first and second reactance elements are configured to detect inputs of different areas of the rotor.

The rotor may include a core rotor and a cover rotor surrounding a portion of the core rotor. One of the first and second portions may include at least a portion of the cover rotor, and the other of the first and second portions may include a portion in the core rotor that is not surrounded by the cover rotor.

One of the first and second portions may be configured to rotate more smoothly than the other of the first and second portions.

One of the first and second portions may be disposed to be relatively close to one end of the rotor, as compared with the other of the first and second portions.

The apparatus may further include a first resonance circuit capacitor disposed at the rotor. The first reactance element may include a first sensing inductor configured such that inductance of the first sensing inductor varies depending on the relative rotation between the first portion and the second portion to form resonance together with the first resonance circuit capacitor.

The apparatus may further include an angular position identification layer having at least a portion overlapping the first sensing inductor, and disposed such that a width of the portion overlapping the first sensing inductor varies depending on the relative rotation between the first portion and the second portion.

The angular position identification layer may include a first angular position identification layer and a second angular position identification layer spaced apart from each other and having respective maximum widths at different respective angular positions. The first sensing inductor may include a plurality of first sensing inductors.

The apparatus may further include a second resonance circuit capacitor disposed at the rotor. The second reactance element may include a second sensing inductor configured such that inductance of the second sensing inductor varies depending on the force applied to the side surface of the rotor to form resonance together with the second resonance circuit capacitor.

The second resonance circuit capacitor may be configured such that capacitance of the second resonance circuit capacitor varies depending on a contact applied to an area overlapping the second sensing inductor on the side surface of the rotor.

The apparatus may further include a resonance circuit inductor disposed at the rotor. The second reactance element may include a sensing capacitor configured such that capacitance of the sensing capacitor varies depending on the contact applied to the side surface of the rotor to form resonance together with the resonance circuit inductor.

The apparatus may further include a substrate on which the first and second reactance elements are disposed.

The apparatus may further include an integrated circuit disposed on the substrate and electrically connected to the first and second reactance elements.

In another general aspect an electronic device includes: the apparatus of described above; the rotor; and a body connected to the rotor.

The electronic may include a wearable electronic device, and the body may be at least a portion of the wearable electronic device.

In another general aspect, an apparatus with rotor input detection includes: a sensing inductor disposed at a rotor configured such that at least a part of the rotor rotates around a rotation axis, and disposed at the rotor such that inductance of the sensing inductor varies depending on a force applied to a side surface of the rotor; a resonance circuit capacitor configured to form resonance together with the sensing inductor depending on the inductance of the sensing inductor; a resonance circuit inductor; and a sensing capacitor disposed at the rotor such that capacitance of the sensing capacitor varies depending on a contact applied to the side surface of the rotor to form resonance together with the resonance circuit inductor. The sensing inductor and the sensing capacitor are configured to detect inputs of different areas of the side surface of the rotor.

The apparatus may further include an additional sensing capacitor configured such that capacitance of the additional sensing capacitor varies depending a contact applied to an area overlapping the sensing inductor on the side surface of the rotor.

An angular position of an area overlapping the sensing inductor on the side surface of the rotor and an angular position of a portion overlapping the sensing capacitor in the side surface of the rotor may be different from each other.

The apparatus of claim 15 may further include: a substrate; and an integrated circuit disposed on the substrate and electrically connected to the sensing inductor, the sensing circuit capacitor, the resonance circuit inductor, and the sensing capacitor.

In another general aspect, an electronic device includes: the apparatus described above; the rotor; and a body connected to the rotor.

The electronic device may include a wearable electronic device, and the body may be at least a portion of the wearable electronic device.

Other features and aspects will be apparent from the following detailed description, the drawings, and the claims.

BRIEF DESCRIPTION OF DRAWINGS

FIGS. 3A and 3B illustrate a structure in which a first reactance element is disposed inside a rotor in an apparatus for detecting different inputs of a rotor, according to an embodiment of.

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1A:
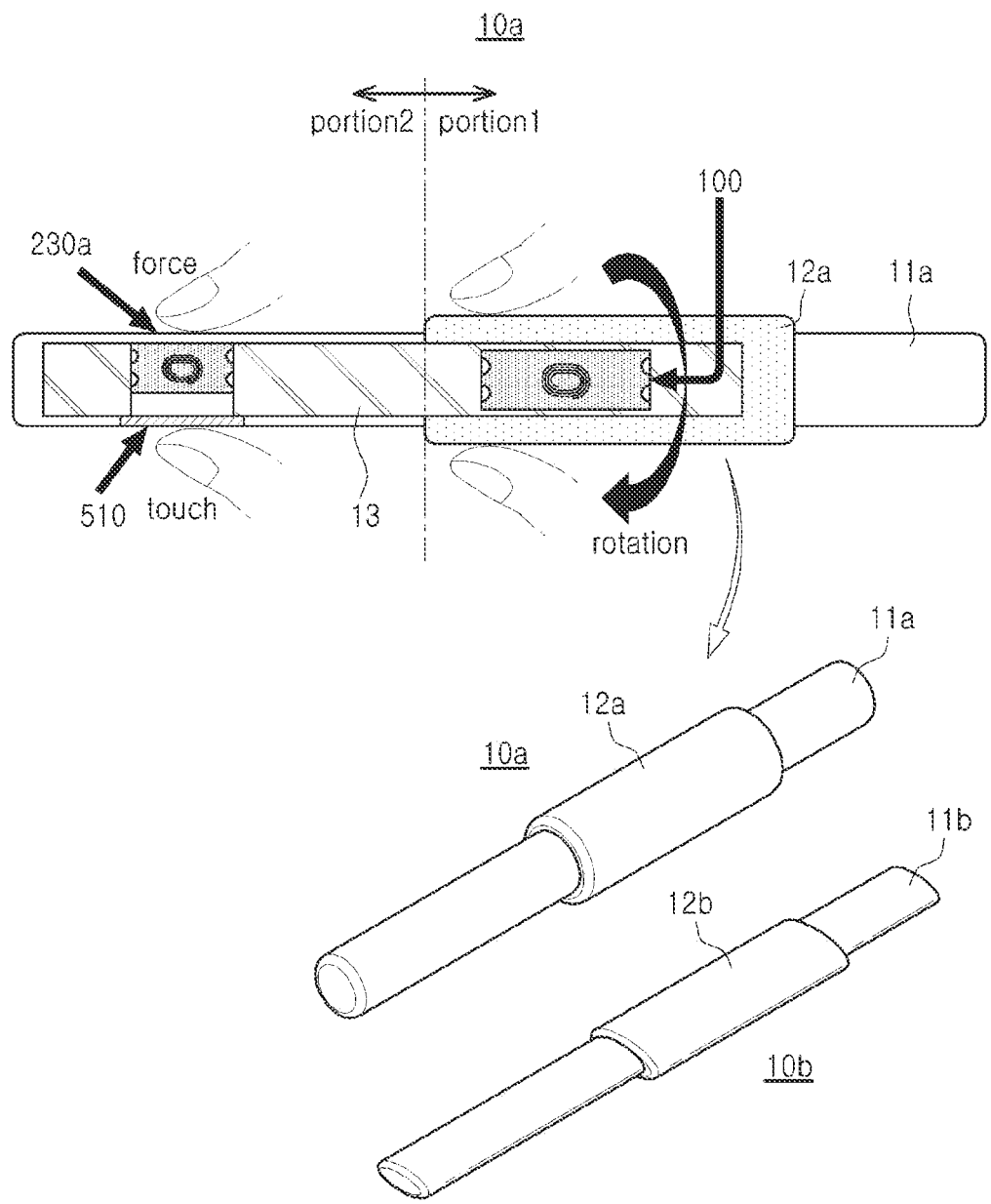
FIGS. 1A and 1B illustrate an apparatus for detecting different inputs of a rotor, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 1B:
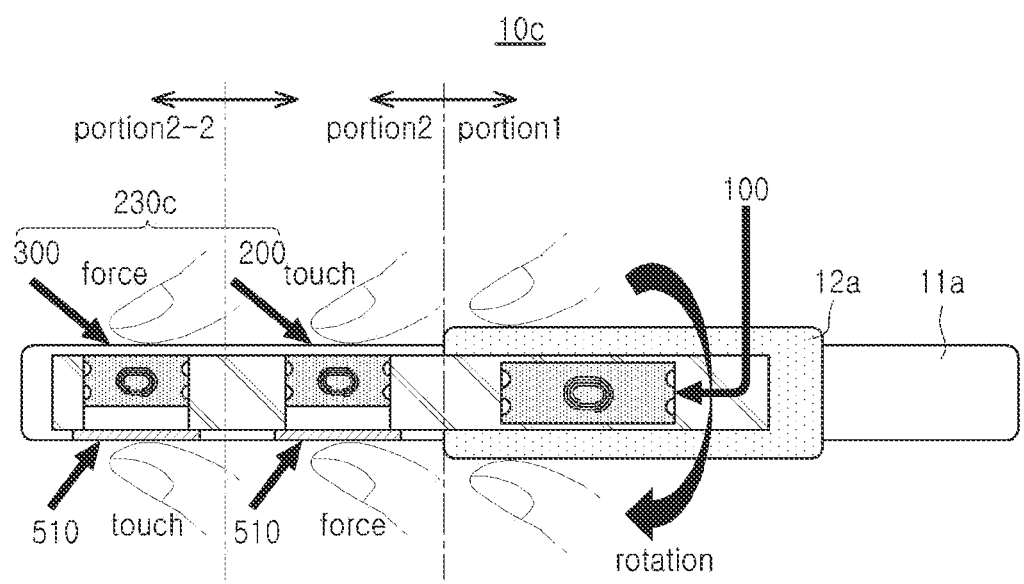

FIGS. 1A and 1B illustrate an apparatus for detecting different inputs of a rotor (hereinafter, "apparatus for detecting rotor inputs"), according to an embodiment.

Referring to FIG. 1A, an apparatus 10a for detecting rotor inputs may include a first reactance element 100 and a second reactance element 230a, and may detect different inputs (for example, rotation, touch, force, and the like) of a rotor-.

The first reactance element 100 may be disposed on the rotor such that reactance of the first reactance element 100 varies depending on relative rotation of the rotor between a first portion portion1 and a second portion portion2. Accordingly, the reactance of the first reactance element 100 may be used to detect a rotation input.

The second reactance element 230a may be disposed on the rotor such reactance of the second reactance element 230a varies depending on a touch and/or a force applied to a side surface of the rotor. Accordingly, the reactance of the second reactance element 230a may be used to detect a touch input and/or a force input.

The reactance of the first and second reactance elements 100 and 230a may correspond to inductance and may correspond to capacitance. Therefore, each of the first and second reactance elements 100 and 230a may include either one or both of an inductor and a capacitor.

Since a reactance-based input detection scheme such as the first and second reactance elements 100 and 230a does not require a complex mechanical structure, the input detection scheme may be advantageous for being provided to a small-sized rotor, and may be advantageous for allowing a rotor to stably detect different inputs.

In addition, since reactance may be used to form resonance and an electrical phenomenon resulting from the reactance may be sensitive to a change in reactance, the reactance-based input sensing scheme such as that implemented by the first and second reactance elements 100 and 230a may efficiently increase input detection sensitivity of the rotor and may be advantageous for allowing the rotor to stably detect different inputs.

In addition, the first and second reactance elements 100 and 230a may cover input detection in different regions of the side surface of the rotor. For example, the first and second reactance elements 100 and 230a may overlap different regions of the side surface of the rotor. A direction of the overlap may be a direction perpendicular to the side surface, and may be a radial direction of a cylindrical coordinate system.

Accordingly, an influence of reactance variation factors of the first and second reactance elements 100 and 230a on each other may be reduced. Therefore, the apparatus 10a for detecting different inputs of a rotor may have a structure advantageous for stably detecting different inputs.

While the first and second reactance elements 100 and 230a overlap different regions of the side surface of the rotor, at least a portion of the first portion portion1 and at least a portion of the second portion portion2 may overlap each other.

Referring to FIG. 1A, the rotor may include a core rotor 11a and/or a cover rotor 12a, and may be configured such that at least a portion (for example, the cover rotor 12a) of the rotor rotates about a rotation axis (for example, a horizontal direction of FIG. 1A). Accordingly, at least a portion of the first portion portion1 and at least a portion of the second portion portion2 may overlap each other.

For example, the core rotor 11a and the cover rotor 12a may each have a cylindrical shape, and a core rotor 11b and a cover rotor 12b of an apparatus 10b for detecting different inputs of a rotor may each have a relatively flat cylindrical shape.

The core rotor 11a may provide a space in which the first and second reactance elements 100 and 230a are disposed. For example, the core rotor 11a may include a supporting rotor 13 and an external housing 510. The external housing 510 may surround the supporting rotor 13, and the supporting rotor 13 may fill at least a portion of a space surrounded by the external housing 510. For example, each of the supporting rotor 13 and the external housing 510 may be implemented using an insulating material (for example, plastic or ceramic) and may include a conductive structure (for example, wires or a portion of a substrate) electrically connected to the first and second reactance elements 100 and 230a.

The cover rotor 12a may surround a portion of the core rotor 11a. For example, one of the first and second portions portion1 and portion2 may include at least a portion of the cover rotor 12a, and the other of the first and second portions portion1 and portion2 may include a portion, which is not surrounded by the cover rotor 12a, in the core rotor 12a. Accordingly, a portion configured to detect rotation and a portion configured to detect touch and/or force may be more clearly distinguished in the rotor, so that the apparatus 10a for detecting different inputs of a rotor may have a structure advantageous for stably detecting different inputs. In addition, the apparatus 10a for detecting rotor inputs may have a structure for clearly notifying a user, who applies an input to a rotor, which input is applied and where the input is applied.

For example, one of the first and second portions portion1 and portion2 may be configured to rotate more smoothly than the other. For example, the cover rotor 12a may slidably rotate on the side surface of the core rotor 11a.

For example, one of the first and second portions portion1 and portion2 may be disposed to be relatively closer to one end of the rotor than the other. For example, a center of one of the first and second portions portion1 and portion2 may be relatively more offset toward one end of the rotor.

Referring to FIG. 1B, an apparatus 10c for detecting rotor inputs may include a plurality of second reactance elements 230c. For example, the second reactance elements 230c may include an inductance element 200 and an inductance and/or capacitance element 300.

A second portion portion2 of a rotor may include a 2-2-th portion portion2-2. The inductance and/or capacitance element 300 may overlap at least a portion of the 2-2-th portion portion2-2, and the inductance element 200 may overlap at least a portion of the other portion of the second portion portion2.

The inductance element 200 may include a sensing inductor disposed on the rotor such that inductance of the inductance element 200 varies depending on a force applied to a side surface of the rotor. The sensing inductor may form a resonance together with a resonance circuit capacitor, and an electrical phenomenon resulting from resonance may be used to detect a force.

The inductance and/or capacitance element 300 may include a sensing capacitor disposed on the rotor such that capacitance of the inductance and/or capacitance element 300 varies depending on a touch of the side surface of the rotor. The sensing capacitor may form resonance together with the resonance circuit inductor, and an electrical phenomenon resulting from the resonance may be used to detect a touch.

The sensing inductor of the inductance element 200 and the sensing capacitor of the inductance and/or capacitance element 300 may cover input detection of different regions of the side surface of the rotor. Accordingly, an influence of reactance variation factors of the inductance element 200 and the inductance and/or capacitance element 300 on each other may be reduced. Therefore, apparatus 10c for detecting rotor inputs may have a structure advantageous for stably detecting different inputs.

For example, an angular position of a region overlapping the sensing inductor on the side surface of the rotor (for example, a lower side of FIG. 1B) and an angular position of a region overlapping the sensing capacitor on the side surface of the rotor (for example, an upper side surface of FIG. 1B) may be different from each other. Accordingly, the apparatus 10c for detecting rotor inputs may have a structure for clearly notifying a user, who applies an input to the rotor, which input is applied and where the input is applied.

Figure 2A:
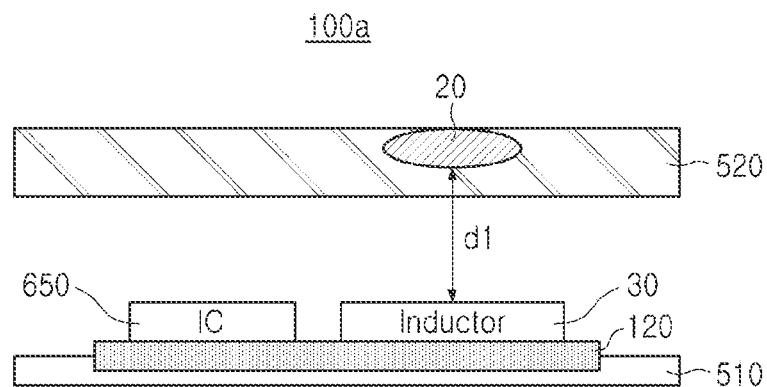
FIGS. 2A to 2C illustrate a structure in which a first reactance element is disposed outside a rotor in an apparatus for detecting different inputs of a rotor, according to an embodiment.
Figure 2B:
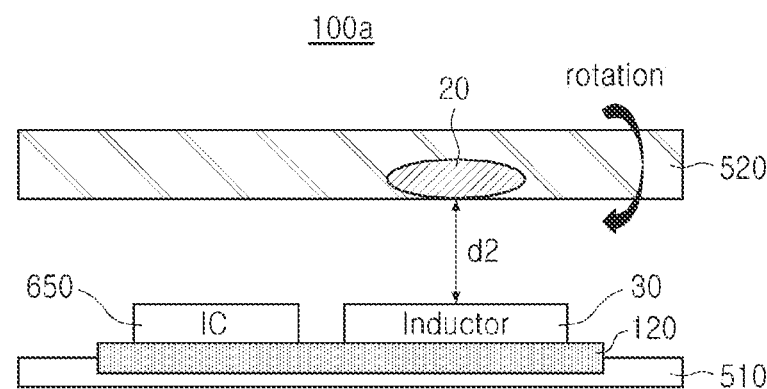
Figure 2C:
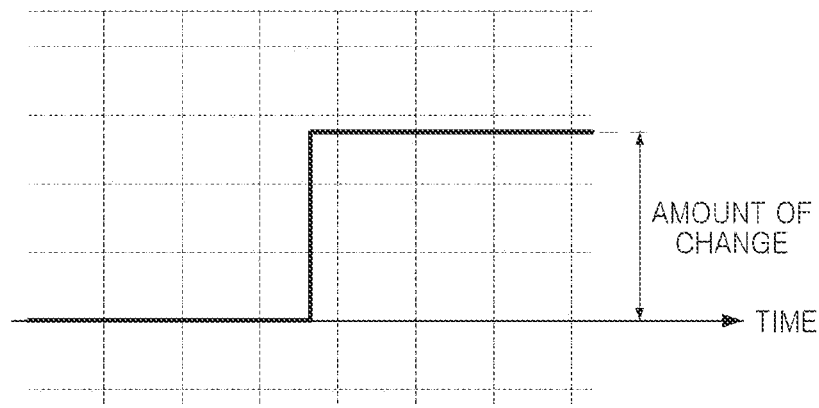

FIGS. 2A to 2C illustrate a structure in which a first reactance element is disposed outside a rotor in an apparatus for detecting rotor inputs, according to an embodiment.

Referring to FIGS. 2A and 2B, a first reactance element 100a may include a first sensing inductor 30. The first sensing inductor 30 may have inductance based on a first distance d1 or a second distance d2 between the first sensing inductor and an angular position identification layer 20.

For example, the first sensing inductor 30 may output magnetic flux as current flows through the first sensing inductor 30. The magnetic flux may cause eddy current flowing through the angular position identification layer 20 overlapping the first sensing inductor 30. The eddy current may generate secondary magnetic flux, and the inductance of the first sensing inductor 30 may vary depending on the secondary magnetic flux. Mutual inductance of the inductance of the first sensing inductor 30 may vary depending on the secondary magnetic flux, and may vary depending on the first distance d1 or the second distance d2.

For example, the first reactance element 100a may be disposed in an external housing 510 disposed outside the rotor, and the angular position identification layer 20 may be disposed in an internal housing 520 disposed inside the rotor. The angular position identification layer 20 may include a high-conductivity material such as copper, aluminum, silver, or gold, but a material of the angular position identification layer 20 is not limited to copper, aluminum, silver, or gold. Also, the angular position identification layer 209 is not limited to a conductive material.

For example, the internal housing 520 may be at least a portion of the supporting rotor 13 illustrated in FIGS. 1A and 1B, and the external housing 510 may be disposed on the cover rotor 12b of FIGS. 1A and 1B, unlike that illustrated in FIGS. 1A and 1B.

A position of the angular position identification layer 20 may vary depending on the rotation of the internal housing 520, and the first or second distances d1 and d2 may also vary depending on the rotation of the internal housing 520. Accordingly, the inductance of the first sensing inductor 30 may vary.

The first sensing inductor 30 may be disposed on the substrate 120 that may be included in the apparatus for detecting different inputs of a rotor, and may be electrically connected to an integrated circuit (IC) 650 through the substrate 120. The IC 650 may also be disposed on the substrate 120, and the substrate 120 may be disposed on the external housing 510. The substrate 120 may be implemented as a printed circuit board (PCB) or a flexible printed circuit board (FPCB).

The first resonance circuit capacitor may also be disposed on the substrate 120, and may form resonance together with the first sensing inductor 30. For example, the IC 650 may generate information on whether a rotation input is applied to the rotor by detecting a resonant frequency of the resonance.

Referring to FIG. 2C, when rotor rotates is assumed to rotate at a constant rotation speed, the inductance of the first sensing inductor 30 or an output value (for example, resonant frequency) based on the inductance may vary by the amount of change in angular position of the rotor.

Figure 3A:
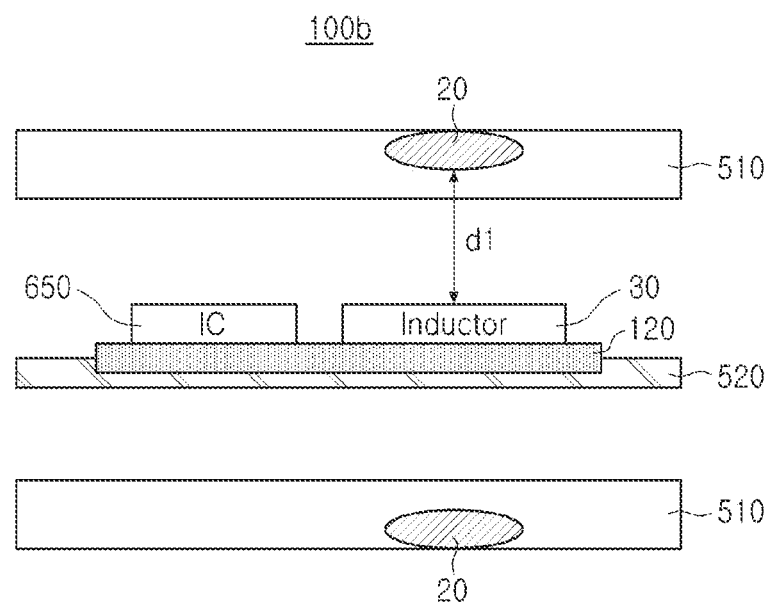
Figure 3B:
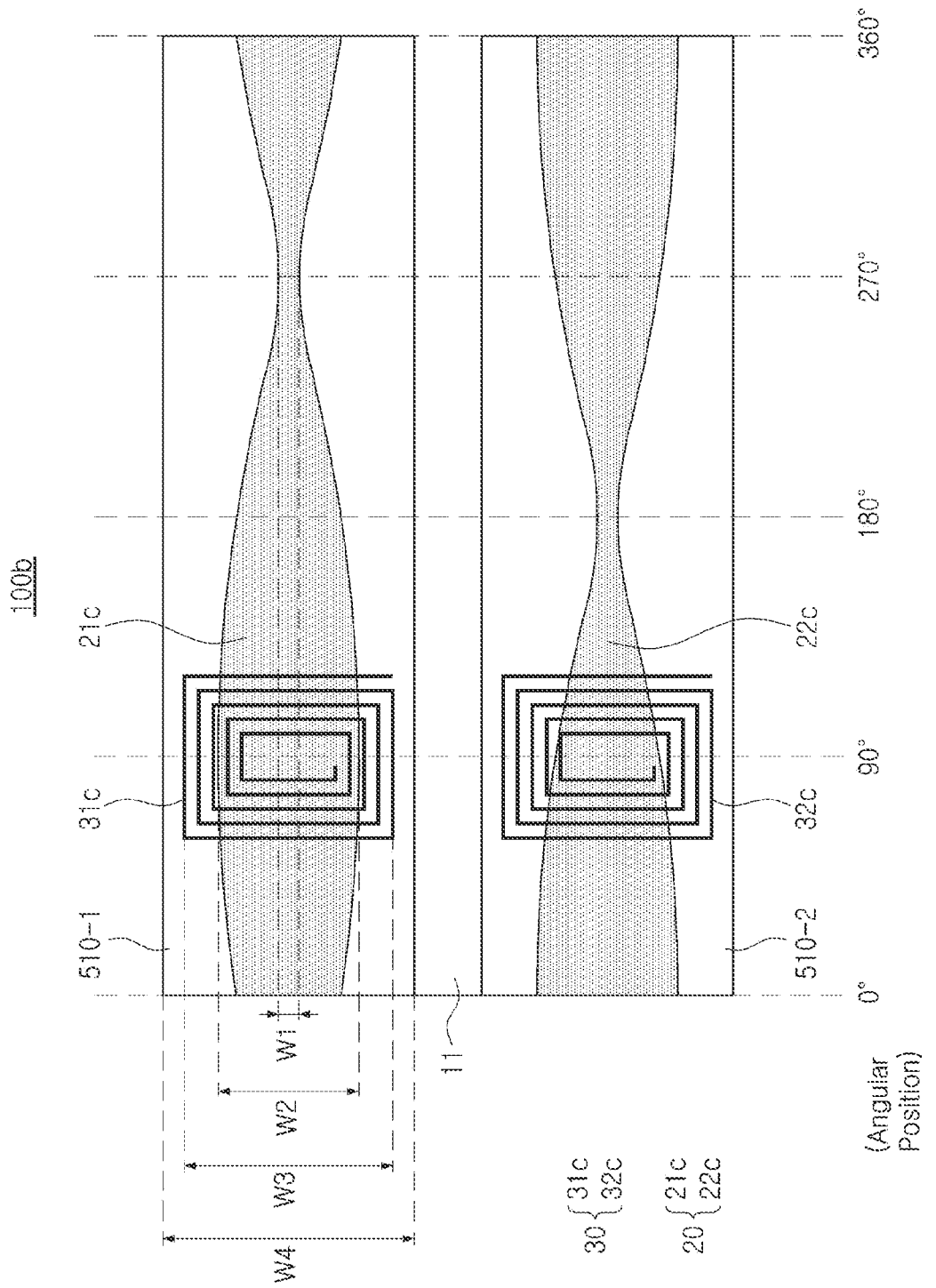

FIGS. 3A and 3B illustrate a structure in which a first reactance element is disposed inside a rotor in an apparatus for detecting different inputs of a rotor, according to an embodiment.

Referring to FIG. 3A, a first reactance element 100b may be disposed in an internal housing 520 disposed on an internal side of a rotor, and an external housing 510 disposed on an external side of the rotor may be disposed on the cover rotor 12b of FIGS. 1A and 1B to rotate, unlike that illustrated in FIGS. 1A and 1B.

For example, a first distance d1 between a first sensing inductor 30 and an angular position identification layer 20 may be maintained according to rotation. Instead, at least a portion of the angular position identification layer 20 may overlap the first sensing inductor 30, and the angular position identification layer 20 may be configured such that a width of the portion overlapping the first sensing inductor 30 varies depending on relative rotation of the external housing 510.

For example, eddy current generated in the angular position identification layer 20 may vary depending on the width of the portion overlapping the first sensing inductor 30 as well as the first distance d1, so that the first sensing inductor 30 may have an inductance varying based on either one or both of the width and the first distance d1.

Referring to FIG. 3B, the angular position identification layer 20 may include a first angular position identification layer 21c and a second angular position identification layers, and the first sensing inductor 30 may include a plurality of sensing inductors 31c and 32c.

When the angular position identification layer 20 is spread out as illustrated in FIG. 3B, the first and second angular position identification layers 21c and 22c may have different angular positions corresponding to a maximum width, and may be spaced apart from each other. A period in which a minimum width W1 of the first and second angular position identification layers 21c and 22c is repeated, may be 360 degrees, and a period in which a maximum width W2 of the first and second angular position identification layers 21c and 22c is repeated, may be 360 degrees.

For example, the first angular position identification layer 21c may have a maximum width W2 at an angular position of 90 degrees, and may have a minimum width W1 at an angular position of 270 degrees. The second angular position identification layer 22c may have a maximum width at an angular position of 0 degrees, and may have a minimum width at an angular position of 180 degrees. That is, one of the first and second angular position identification layers 21c and 22c may be rotated quarter turns (90 degrees) more than the other to surround a side surface of the rotor 11. Accordingly, the integrated parameter to which the first and second inductances of the first and second inductors 31c and 32c are applied as the first and second parameters, may have a higher correlation to the angular position. In addition, the linearity of the change in the integration parameter, depending on a change of the angular position, may be further improved.

For example, the first and second angular position identification layers 21c and 22c may each have a boundary line in the form of a sinusoidal wave, and may have the same shape. Accordingly, a parameter based on arctan processing of the first and second inductances of the first and second inductors 31c and 32c may be changed at a constant rate depending on the change of the angular position.

The greater a difference between the maximum width W2 and the minimum width W1 of the first and second angular position identification layers 21c and 22c, the greater the amount of change depending on the change in the angular position of the integrated parameter of the first and second inductances of the first and second inductors 31c and 32c. Therefore, sensitivity of the angular position of the integrated parameter may be further improved.

For example, the maximum width W2 of the first and second angular position identification layers 21c and 22c may be smaller than a maximum width W3 of the first sensing inductor 30, and may be smaller than a width W4 of portions 510-1 and 510-2 of the external housing.

The first sensing inductor 30 may be in the form of a coil. For example, the first sensing inductor 30 may be implemented in various forms such as a winding type, a square type, a circle type, or a track type, and may be implemented as a wiring pattern on a PCB or FPCB, or as a chip inductor. Second and third sensing inductors and a resonance circuit inductor to be described later may also be implemented in the same manner as the first sensing inductor 30.

FIGS. 4A to 4G illustrate an inductance detection scheme of a second reactance element of an apparatus for detecting rotor inputs, according to an embodiment of the present disclosure.

Figure 4A:
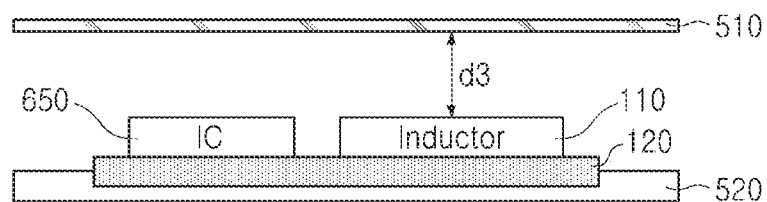
FIGS. 4A to 4G illustrate an inductance detection scheme of a second reactance element of an apparatus for detecting different inputs of a rotor, according to an embodiment.
Figure 4B:
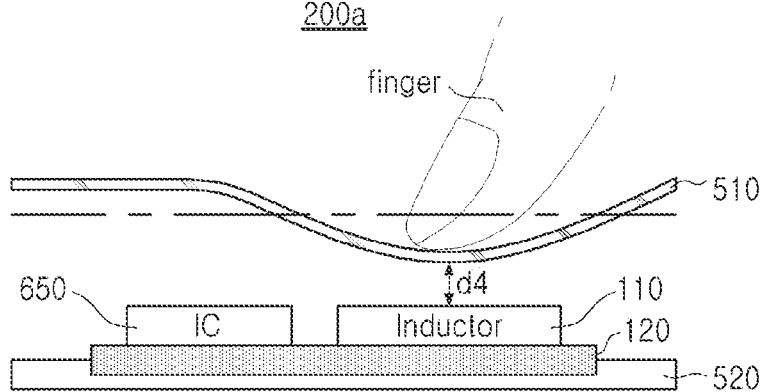

Referring to FIGS. 4A and 4B, an inductance element 200a of the second reactance element may include a second sensing inductor 110, and may have inductance based on a third distance d3 or a fourth distance d3 between the second sensing inductor 110 and the housings 510.

That is, as the external housing 510 is pressed by user (finger) force, the second sensing inductor 110 may come closer to the external housing 510, and mutual inductance of the second sensing inductor 110 may also change.

The second sensing inductor 110 may be disposed on the substrate 120 that may be included in the apparatus for detecting different inputs of a rotor, and may be electrically connected to the integrated circuit (IC) 650 through the substrate 120. The substrate 120 may be disposed in the internal housing 520, but embodiments are not limited to such a configuration. For example, the internal housing 520 and the external housing 510 of FIGS. 4A to 4G may be replaced with each other.

For example, the inductance element 200a of the first inductance element 100a and the second reactance element illustrated in FIGS. 2A and 2B may be disposed in different regions of the common substrate 120, and may be electrically connected to the common IC 650.

A second resonance circuit capacitor may also be disposed on the substrate 120, and may form resonance together with the second sensing inductor 110. For example, the IC 650 may generate information on whether a force input is applied to the rotor by detecting a resonant frequency of the resonance.

Figure 4C:
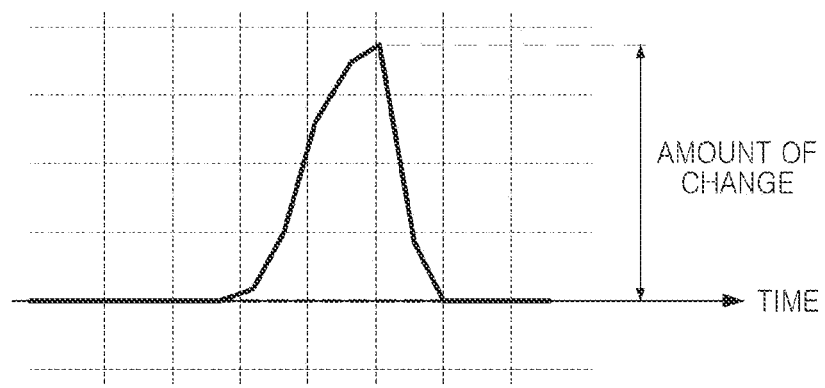

Referring to FIG. 4C, when a force input is assumed to be applied to the rotor at about an intermediate time, inductance of the second sensing inductor 110 or an output value (for example, a resonant frequency) based on the inductance may change by the amount of change in force applied to the rotor.

Figure 4D:
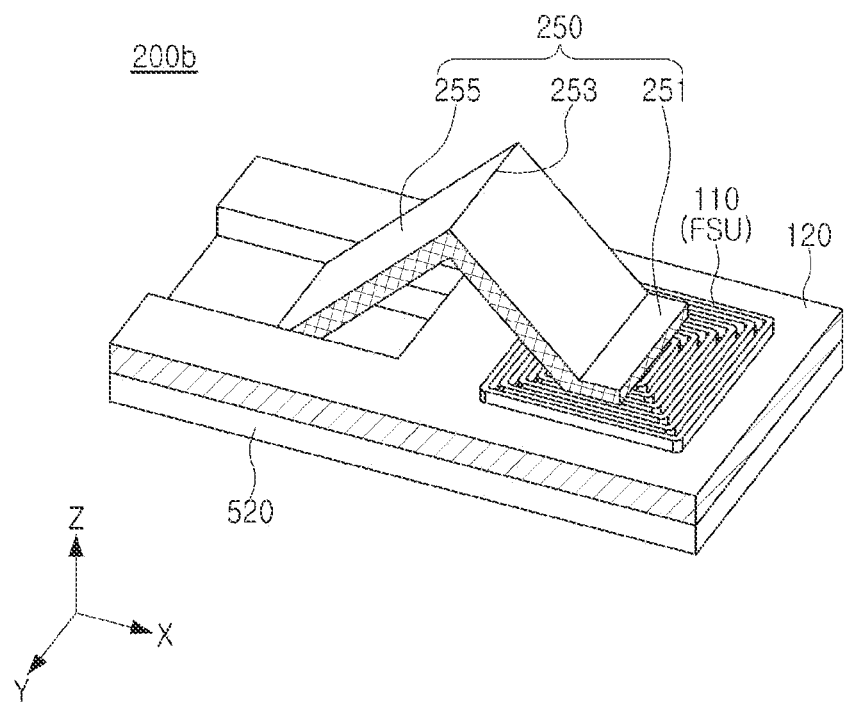
Figure 4E:
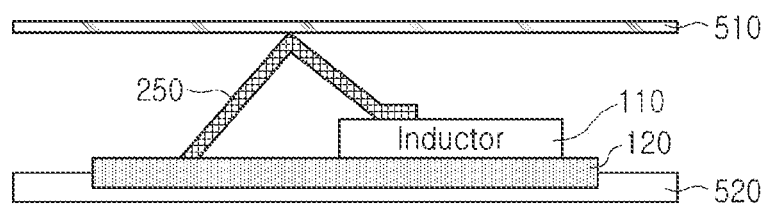

Referring to FIGS. 4D and 4E, an inductance element 200b of a reactance element may further include a force expansion member 250. For example, the force expansion member 250 may include a conductive material and/or an elastic material, may not be electrically connected to the second sensing inductor 110, and may be connected to the other housing 520 through a portion 255.

When a force input is applied to one housing 510, an edge radius 253 of the force extension member 250 may receive the force, one end 251, disposed on the second sensing inductor 110, of both ends of the force expansion member 250 may move in a horizontal direction according to the force, and an angle between a direction from the one end 251 to the edge radius and an upper surface of the second sensing inductor 110 may also change. Accordingly, the second sensing inductor 110 may have inductance varying more sensitively depending on the force, and force input sensing sensitivity of the rotor may be further improved.

Figure 4F:
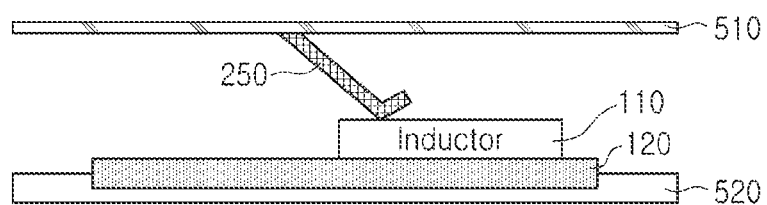

Referring to FIG. 4F, an inductance element 200c of a second reactance element may include a force expansion member 250 having a simpler shape. For example, the force expansion member 250 may be connected to only one of the internal housing 520 and the external housing 510.

Figure 4G:
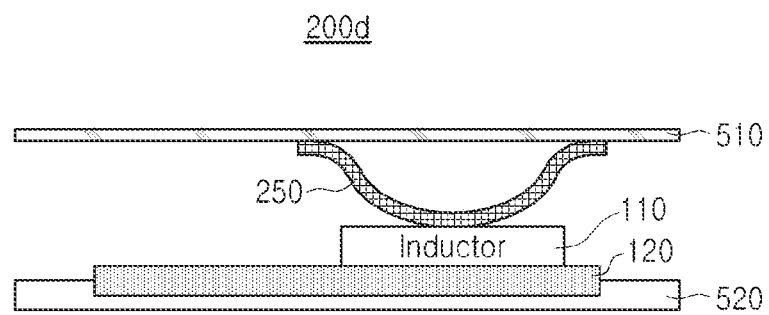

Referring to FIG. 4G, an inductance element 200d of a second reactance element may include a force expansion member 250 having a shape capable of further expanding a force input applying range of the external housing 510. For example, one end and the other end of the force expansion member 250 may be connected to only one of the internal housing 520 and the external housing 510.

FIGS. 4A to 4G illustrate a structure in which the inductance element 200a is disposed between the external housing 510 and the internal housing 520, but the inductance element 200a may be surrounded by the external housing 510 and the internal housing 520 may be omitted. Therefore, the internal housing 520 illustrated in FIGS. 4A to 4G may be replaced with another portion of the external housing 510. For example, the inductance element 200a may occupy most of a space from one side surface 510 of the external housing (for example, the upper surface of FIGS. 4A to 4G) to the other side surface (for example, the lower surface of FIGS. 4A to 4G) opposing the one side surface.

FIGS. 5A to 5D illustrate an inductance and/or capacitance detection scheme of a second reactance element of an apparatus for detecting rotor inputs, according to an embodiment.

Figure 5A:
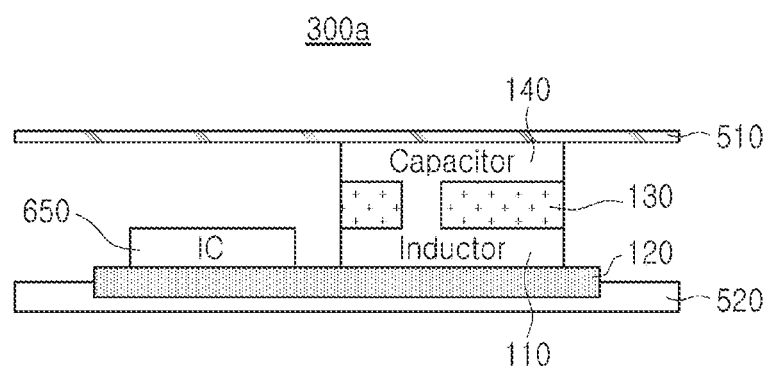
FIGS. 5A to 5D illustrate an inductance and/or capacitance detection scheme of a second reactance element of an apparatus for detecting different inputs of a rotor, according to an embodiment.

Referring to FIG. 5A, an inductance and/or capacitance element 300a of a second reactance element may include at least one of a sensing capacitor 140 and a second sensing inductor 110.

The sensing capacitor 140 may have capacitance varying depending on a contact applied to a side surface of a rotor, and the second sensing inductor 110 may have inductance varying depending on a force applied to the side surface of the rotor.

When the inductance and/or capacitance element 300a includes both the sensing capacitor 140 and the second sensing inductor 110, the inductance and/or capacitance element 300a may have reactance varying depending on a contact input and a force input of one region of the side surface of the rotor.

Depending on a design, the sensing capacitor 140 and the second sensing inductor 110 may form a single resonance together, or may form a plurality of resonances together with a resonance circuit inductor or a resonance circuit capacitor. For example, the resonant circuit inductor and/or the resonance circuit capacitor may be disposed on the substrate 120.

For example, the sensing capacitor 140 and the second sensing inductor 110 may be physically coupled to each other through a bracket 130. The bracket 130 may be formed of a nonconductive material such as plastic or a conductive material such as metal, and may be a portion of the supporting rotor 13 illustrated in FIGS. 1A and 1B. A vertical spacing relationship between the sensing capacitor 140 and the second sensing inductor 110 may vary depending on a design.

The sensing capacitor 140 and the second sensing inductor 110 may be disposed on the substrate 120 that may be included in an apparatus for detecting rotor inputs, and may be electrically connected to an integrated circuit (IC) 650 through the substrate 120. For example, the first inductance element 100a illustrated in FIGS. 2A and 2B and the inductance element 200a and the inductance and/or capacitance element 300a of the second reactance element illustrated in FIGS. 4A and 4B may be disposed in different regions of the common substrate 120, and may be electrically connected to the common IC 650.

Figure 5B:
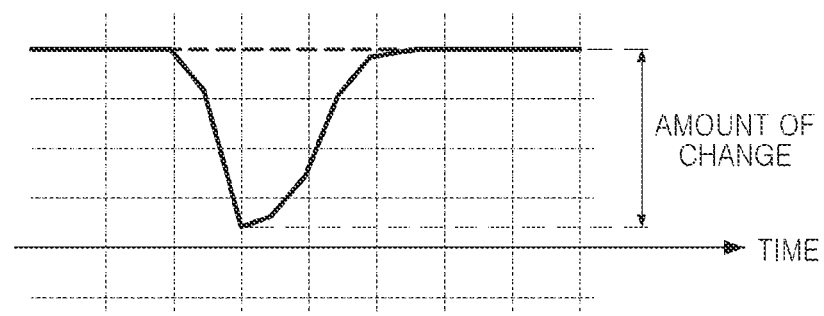

Referring to FIG. 5B, when a contact input is assumed to be applied to the rotor at about an intermediate time, capacitance of the sensing capacitor 140 or an output value (for example, a resonant frequency) based on the capacitance may vary by the amount of change in contact applied to the rotor.

Figure 5C:
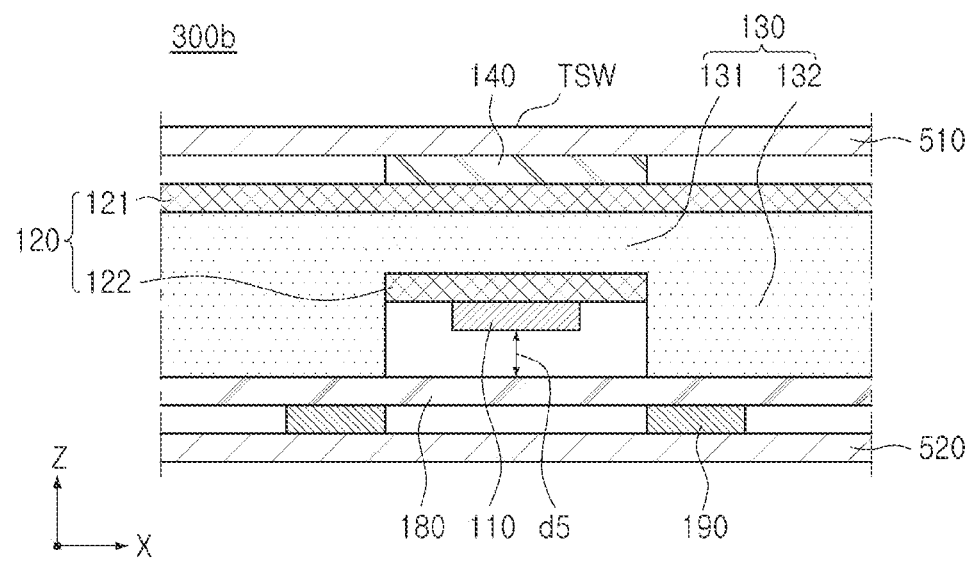
Figure 5D:
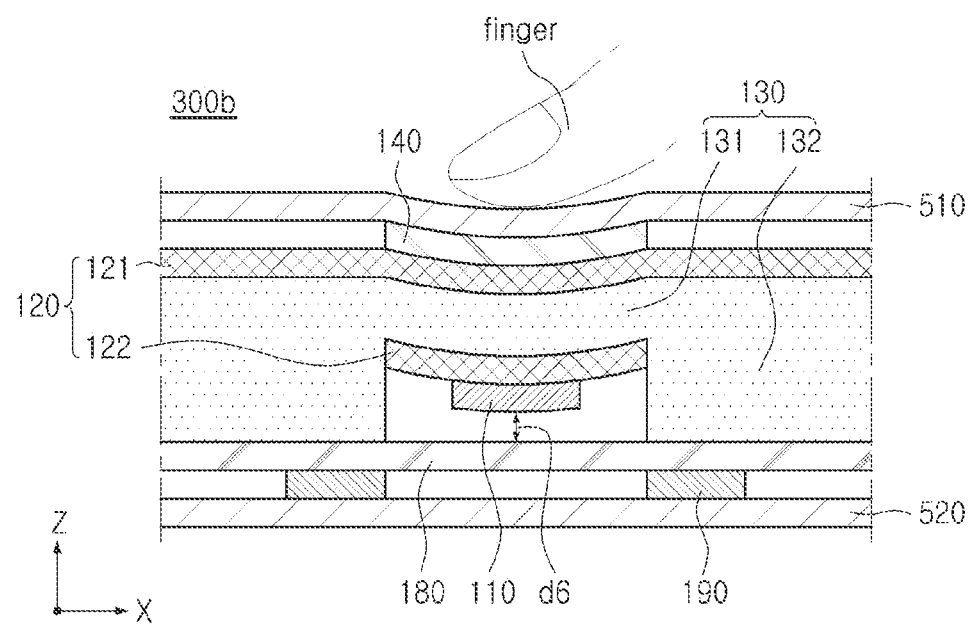

Referring to FIGS. 5C and 5D together, an inductance and/or capacitance element 300b may include at least one of the second sensing inductor 110, the substrate 120, the bracket 130, and the sensing capacitor 140.

The second sensing inductor 110 may be disposed to face and to be spaced apart from a metal portion 180, and may approach the metal portion 180 as a touch is applied. In this case, as the touch is applied, the second sensing inductor 110 may have a variable inductance while moving in a touch application direction.

As illustrated in FIGS. 5C and 5D, the second sensing inductor 110 may move in the direction toward the metal portion 180 as a force touch is applied. Then, a distance between the second sensing inductor 110 and the metal portion 180 may decrease from d5 to d6, for example.

In this case, current may flow through the second sensing inductor 110, and a magnitude of eddy current may change due to a change in a distance between the metal portion 180, a surrounding conductor, and the second sensing inductor 110. In addition, inductance of the second sensing inductor 110 may increase or decrease due to the changed eddy current.

The substrate 120 has a space in which the second sensing inductor 110 and the sensing capacitor 140 are disposed, and may be supported by the bracket 130. In this case, portions of the substrate 120 on which the second sensing inductor 110 and the sensing capacitor 140 are mounted, may be formed to be independent of each other or may be formed into a single substrate.

For example, the substrate 120 may include a first substrate 121 and a second substrate 122, respectively disposed on one side and another side of the bracket 130. The sensing capacitor 140 may be disposed on the first substrate 121, and the second sensing inductor 110 may be disposed on the second substrate 122. In this case, the second sensing inductor 110 and the sensing capacitor 140 may be disposed such that at least some regions thereof overlap each other.

In other words, the first substrate 121 may be disposed between the sensing capacitor 140 and the bracket 130, and the second substrate 122 may be disposed between the second sensing inductor 110 and the bracket 130. In addition, the sensing capacitor 140 may be disposed on one side of the bracket 130, and the second sensing inductor 110 may be disposed on the other side of the bracket 130. In this case, the sensing capacitor 140 and at least some regions may overlap with each other.

For example, the first and second substrates 121 and 122 may be connected to each other to form a single substrate 120. For example, the substrate 120 may be overall integrated as a single structure, and a certain region of the substrate 120 may be bent to be respectively implemented as the first and second substrates 121 and 122 on both sides of the bracket 130. Accordingly, the second sensing inductor 110 and the sensing capacitor 140 may be mounted on the same surface of the substrate 120.

In addition, a winding axis of the second sensing inductor 110 and a central axis of a contact surface of the sensing capacitor 140 may match each other. In this case, a center of a touch switch region TSW included in the external housing 510 may also be disposed to match the winding axis of the second sensing inductor 110. In this case, a single touch applied to the touch switch region TSW by a user may result in an effect of applying a force touch to the second sensing inductor 110 and simultaneously applying a contact touch to the sensing capacitor 140.

The bracket 130 may be disposed between the external housing 510 and the second sensing inductor 110 to support the second sensing inductor 110, and may be deformed as a touch is applied.

Referring to FIGS. 5C and 5D, as a touch is applied, the bracket 130 may be deformed to protrude in a direction in which the second substrate 122 is disposed, for example, in a direction in which the second sensing inductor 110 is disposed. In this case, together with the bracket 130, the first and second substrates 121 and 122 may also be deformed to be bent in a direction to which the touch is applied. Then, the second sensing inductor 110, which is disposed on the second substrate 122, may have a variable inductance while moving in the touch application direction to the extent of occurrence of the deformation of the bracket 130 and the substrate 120.

The bracket 130 may include a pair of support portions 132 extending in a direction in which the second substrate 122 is disposed, and the second sensing inductor 110 may be disposed between the pair of support portions 132. In addition, the bracket 130 may be disposed between the first and second substrates 121 and 122, and may further include a pressing portion 131 connecting the pair of support portions 132 to each other.

For example, the pressing portion 131 may be disposed on the same vertical line as the second sensing inductor 110 and the sensing capacitor 140 to receive pressure generated by a touch applied to the external housing 510. In addition, the pressing portion 131 may be bent in a direction in which the metal portion 180 is disposed, depending on the magnitude of the received pressure.

A pair of support portions 132, respectively extending in the direction in which the metal portion 180 is disposed, may be respectively disposed on both sides of the pressing portion 131 such that a separation distance between the first substrate 121 and the metal portion 180 is maintained to be constant.

In this case, a thickness in a direction in which the support portion 132 extends, for example, a thickness in a vertical direction of the support portion 132 in FIG. 5C, may be greater than the sum of thicknesses of the pressing portion 131, the second substrate 122, and the second sensing inductor 110 in the same direction. In this case, a predetermined separation distance may be formed between the second sensing inductor 110 and the metal portion 180.

Referring to FIGS. 5C and 5D, the bracket 130, including the pair of support portions 132 and the pressing portion 131, may form a single open region overall. In this case, the second sensing inductor 110 may be disposed in an internal space surrounded by the pair of support portions 132 and pressing portion 131.

In other words, regions between the bracket 130 and the metal portion 180 may be spaced apart from each other to form an open space, and the second sensing inductor 110 may be disposed in the open space. In this case, the second sensing inductor 110 may be disposed on one side of the pressing portion 131 in the open space to be spaced apart from the metal portion 180. The bracket 130 may be formed of a nonconductive material such as plastic, or a conductive material such as a metal.

The sensing capacitor 140 may be disposed between the external housing 510 and the bracket 130, and may have capacitance that is variable as a touch is applied. For example, the sensing capacitor 140 may be in the form of a pad.

The sensing capacitor 140 may be disposed to be in contact with the external housing 510 of the electronic device 10 to detect a change in capacitance formed as an external contact is applied to the touch switch region TSW. In this case, the sensing capacitor 140 and the second sensing inductor 110 may be disposed on the same vertical line, so that the force touch and the contact touch may be simultaneously detected by a single touch operation.

An elastic portion 190 may be disposed to support the metal portion 180, and may be compressed to be deformed by receiving pressure from the metal portion 180 as a touch is applied. The elastic portion 190 may serve to buffer the touch and/or force.

FIGS. 5C and 5D illustrate a structure in which the inductance and/or capacitance element 300b is disposed between the external housing 510 and the internal housing 520, but the inductance and/or capacitance element 300a may be surrounded by the external housing 510 and the internal housing 520 may be omitted. Therefore, the internal housing 520 illustrated in FIGS. 5C and 5D may be replaced with another portion of the external housing 510. For example, the inductance and/or capacitance element 300b may occupy most of a space from one side surface of the external housing 510 (for example, an upper surface of FIGS. 5C and 5D) to the other side surface (for example, the lower surface of FIGS. 5C and 5D) opposing the one side surface.

Figure 6:
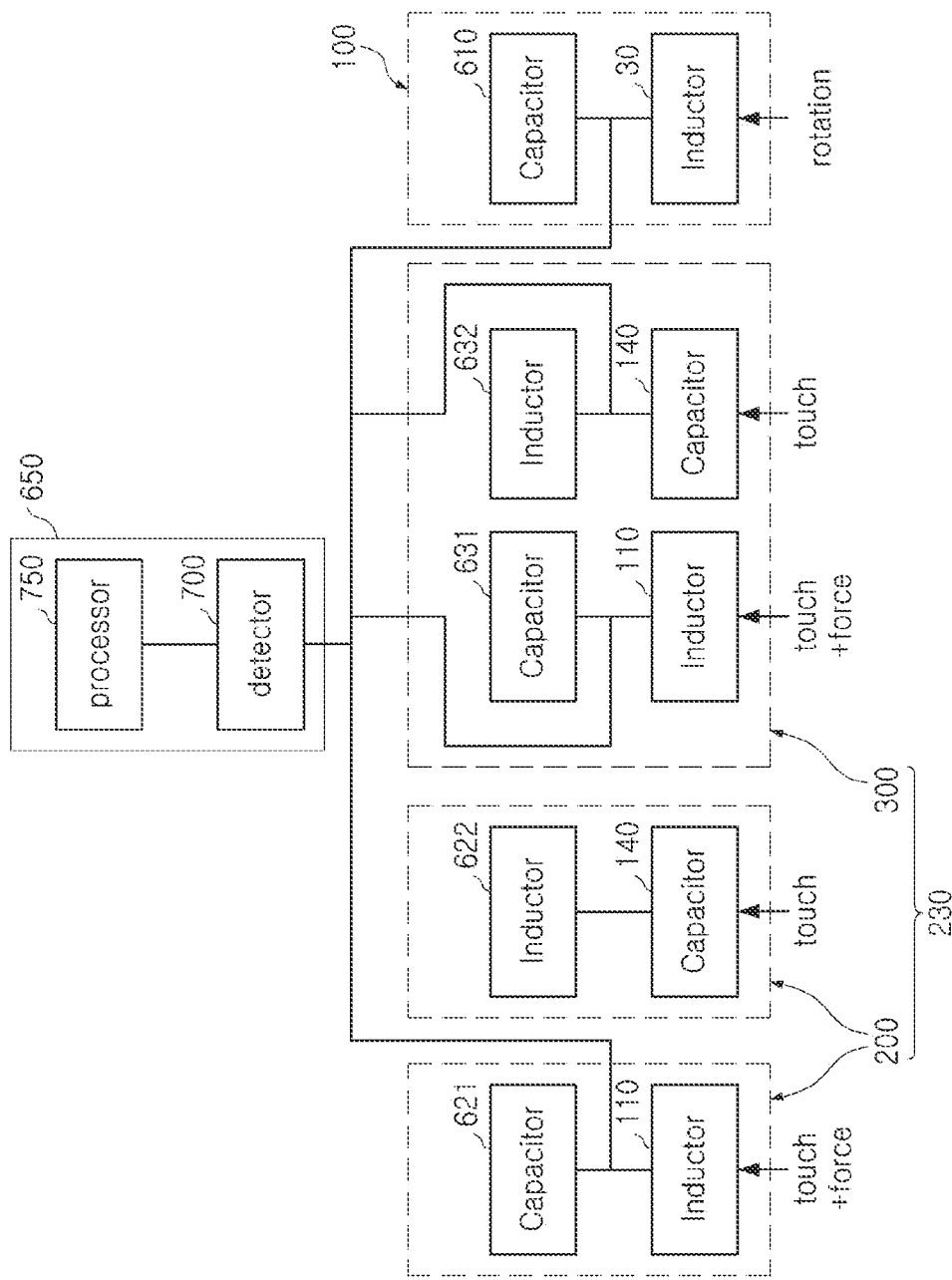
FIG. 6 illustrates an electrical connection relationship of an apparatus for detecting different inputs of a rotor, according to an embodiment.

FIG. 6 illustrates an electrical connection relationship of an apparatus for detecting rotor inputs, according to an embodiment.

Referring to FIG. 6, the integrated circuit (IC) 650 of an apparatus for detecting rotor inputs may be electrically connected to the first sensing inductor 30, the second sensing inductor 110, the sensing capacitor 140, resonance circuit capacitors 610, 621, and 631, and resonance circuit inductors 622 and 632.

The first reactance element 100 may include the first sensing inductor 30 and a resonant circuit capacitor 610. The first sensing inductor 30 and the resonant circuit capacitor 610 may be electrically connected to each other, and may form resonance together.

A second reactance element 230 may include the second sensing inductor 110 and the resonance circuit capacitors 621 and 631, and the second sensing inductor 110 and the resonance circuit capacitors 621 and 631 may be electrically connected to each other, and may form resonance together. The sensing capacitor 140 and the resonance circuit inductors 622 and 632 may be electrically connected to each other, and may form resonance together.

The IC 650 may include either one or both of a detector 700 and a processor 750. For example, the detector 700 may include at least some of an analog-to-digital converter, an amplifier, a buffer, and a feedback circuit, and the processor 750 may include a digital circuit configured to generate information, corresponding to whether different inputs are detected, based on an output value of the detector 700.

Figure 7A:
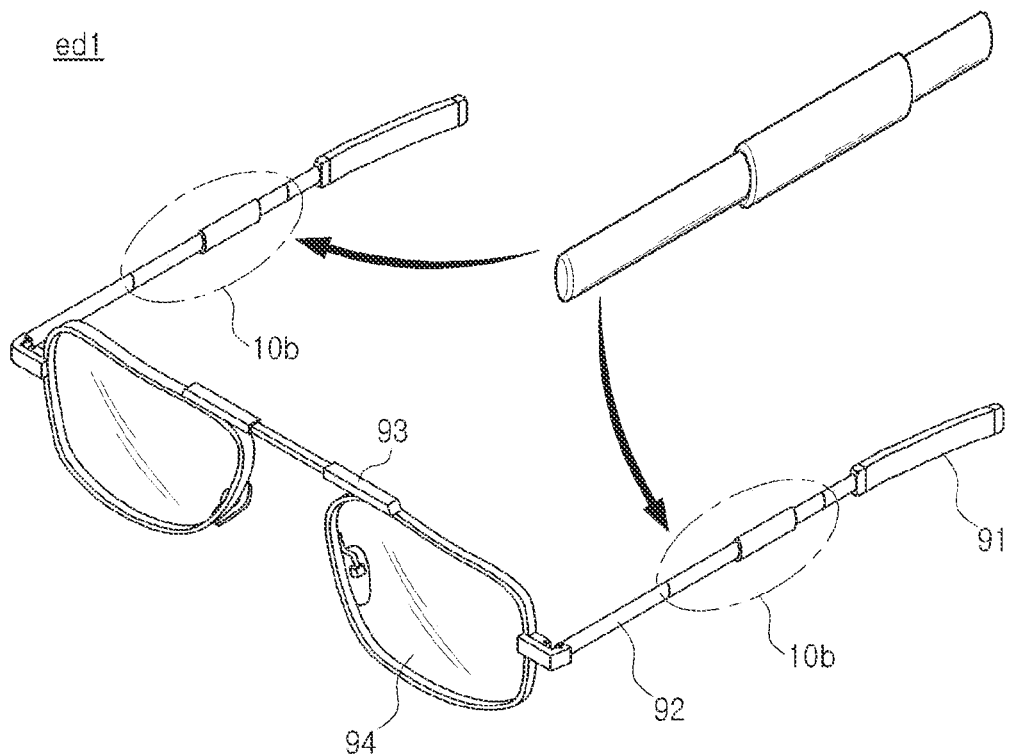
FIGS. 7A to 7C illustrate an electronic device including an apparatus for detecting different inputs of a rotor, according to an embodiment.
Figure 7B:
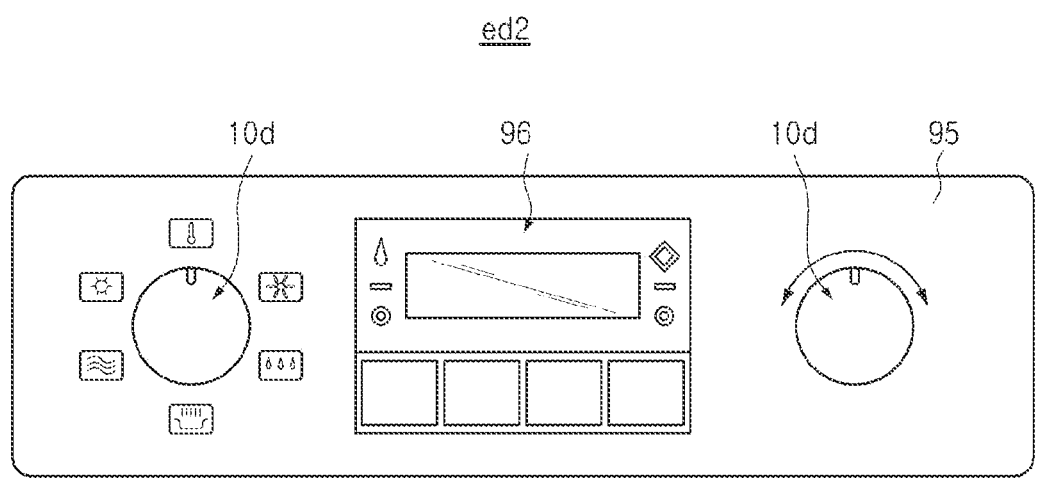
Figure 7C:
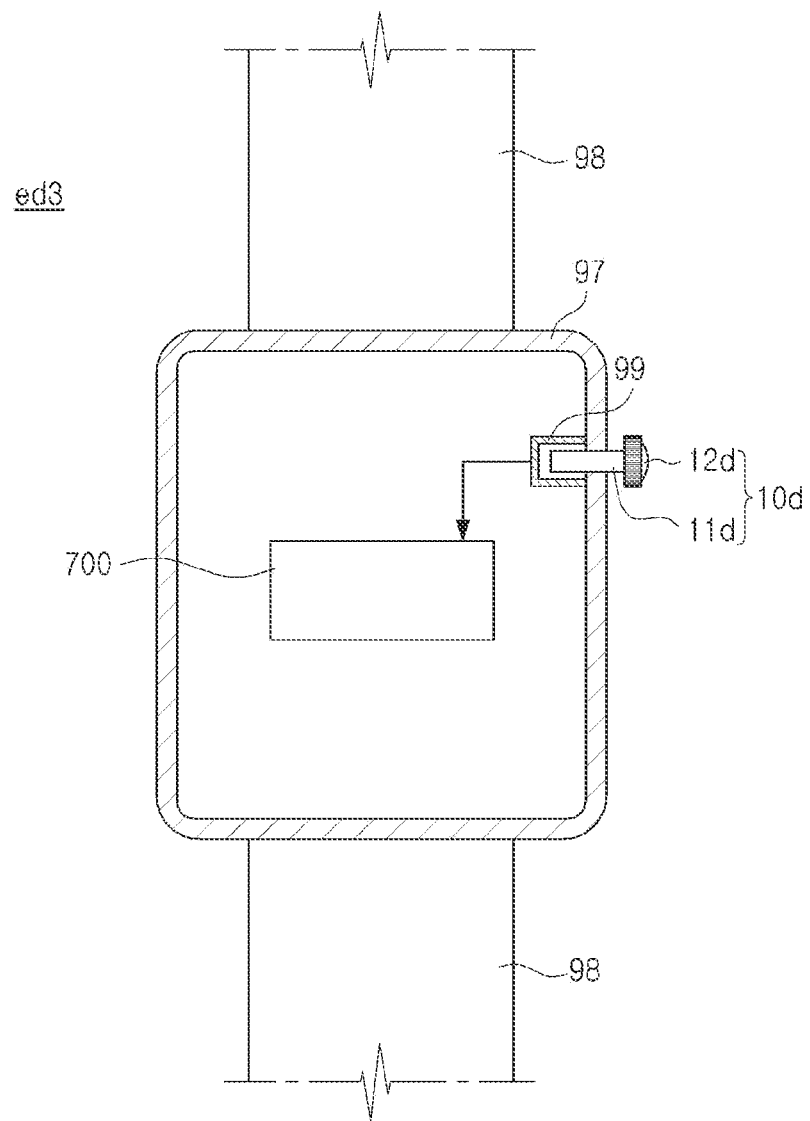

FIGS. 7A to 7C illustrate an electronic device including an apparatus for detecting rotor inputs, according to an embodiment.

Referring to FIG. 7A, an electronic device ed1 including an apparatus 10b for detecting rotor inputs may include a body, and the body may be at least a portion of a wearable electronic device.

For example, the body may include any one or any combination of any two or more of a first member 91, a second member 92, a third member 93, and a fourth member 94, and may be at least a portion of electronic glasses. The apparatus 10b for detecting rotor inputs may be connected between the first and second members 91 and 92, the third member 93 may be connected between a plurality of second members 92, and the fourth member 94 may be connected to the third member 93.

For example, the first, second, and third members 91, 92, and 93 may be implemented using a light insulating material such as plastic, and may have a structure incorporating an electric wire electrically connected to the apparatus 10b for detecting rotor inputs. The fourth member 94 may be implemented using a transparent material such as glass and may be configured for an electromagnetic display, similarly to a display panel of an electronic device. The second member 92 may include an integrated circuit (IC) controlling a display of the fourth member 94, and the IC may be electrically connected to the apparatus 10b for detecting rotor inputs and/or the fourth member 94.

Referring to FIG. 7B, an electronic device ed2 including an apparatus 10d for detecting rotor inputs may include a body, and the body may be at least a portion of a home appliance (for example, a refrigerator, a microwave oven, washing machine, an air purifier, a water purifier, or the like).

For example, the body may include at least one of a fifth member 95 and a sixth member 96. The sixth member 96 may be implemented using a transparent material such as glass, and may be configured for an electromagnetic display, similarly to a display panel of an electronic device. The fifth member 95 may include an integrated circuit (IC) controlling the display of the sixth member 96, and the IC may be electrically connected to an apparatus 10*d* for detecting different inputs of a rotor 10*d* and/or the sixth member 96.

Referring to FIG. 7C, an electronic device ed3 including an apparatus 10*d* for detecting rotor inputs may include a main body, and the main may be at least a portion of a wearable electronic device.

For example, the body may include any one or any combination of any two or more of a seventh member 97, an eighth member 98, and a ninth member 99, and may be at least a portion of an electronic watch. The apparatus 10*d* for detecting rotor inputs may be connected to the seventh member 97, and the eighth member 98 may be connected to the seventh member 97 and may be configured to be worn by a user, similarly to a strap. The ninth member 99 may be electrically connected between an integrated circuit (IC) embedded in the electronic watch and the apparatus 10*d* for detecting rotor inputs. The apparatus 10*d* for detecting rotor inputs may include a core rotor 11*d* and a cover rotor 12*d*, and may be at least a portion of a crown of the electronic watch.

In addition to the electronic devices ed1, ed2, and ed3 illustrated in FIGS. 7A to 7C, an electronic device including an apparatus for detecting rotor inputs may be a smartwatch, a smartphone, a personal digital assistant (PDA), a digital video camera, a digital still camera, a network system, a computer, a monitor, a tablet PC, a laptop computer, a netbook, a television, a videogame console, an automobile, or the like, but is not limited to these examples. Depending on a design, an electronic device including an apparatus for detecting rotor inputs may include a storage element for storing data, such as a memory or a storage, may include a communications element remotely transmitting and receiving data, such as a communications modem and an antenna, and may include a processor implemented as a central processing unit (CPU), a graphics processing unit (GPU), a microprocessor, an application specific integrated circuit (ASIC), a field programmable gate arrays (FPGA), or the like.

The processor may interwork with a memory or a storage, and may generate data based on an output of an integrated circuit (IC) of the apparatus for detecting rotor inputs. Accordingly, the electronic device may generate various pieces of data based on different inputs detected by the apparatus for detecting rotor inputs, and may output the data through a display panel.

As described above, a rotor may have a structure advantageous for stably detecting different inputs. Alternatively, the rotor may be easily miniaturized while detecting different inputs. Alternatively, the rotor may efficiently improve sensitivity of detecting different inputs. Alternatively, a user may efficiently apply different inputs to the rotor.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus with rotor input detection, the apparatus comprising:
 a first reactance element disposed at a rotor configured such that at least a part of the rotor rotates around a rotation axis, and disposed at the rotor such that reactance of the first reactance element varies depending on relative rotation between a first portion of the rotor and a second portion of the rotor;
 a second reactance element disposed at the rotor such that reactance of the second reactance element varies depending on a contact or a force applied to a side surface of the rotor; and
 a first resonance circuit capacitor disposed at the rotor,
 wherein the first and second reactance elements are configured to detect inputs of different areas of the rotor, and
 the first reactance element includes a first sensing inductor configured such that inductance of the first sensing inductor varies depending on the relative rotation between the first portion and the second portion to form resonance together with the first resonance circuit capacitor.

2. The apparatus of claim 1, wherein the rotor includes a core rotor and a cover rotor surrounding a portion of the core rotor, and
 wherein one of the first and second portions includes at least a portion of the cover rotor, and the other of the first and second portions includes a portion in the core rotor that is not surrounded by the cover rotor.

3. The apparatus of claim 1, wherein one of the first and second portions is configured to rotate more smoothly than the other of the first and second portions.

4. The apparatus of claim 1, wherein one of the first and second portions is disposed to be relatively close to one end of the rotor, as compared with the other of the first and second portions.

5. The apparatus of claim 1, further comprising:
 a resonance circuit inductor disposed at the rotor,
 wherein the second reactance element includes a sensing capacitor configured such that capacitance of the sensing capacitor varies depending on the contact applied to the side surface of the rotor to form resonance together with the resonance circuit inductor.

6. The apparatus of claim 1, further comprising:
 an angular position identification layer having at least a portion overlapping the first sensing inductor, and disposed such that a width of the portion overlapping the first sensing inductor varies depending on the relative rotation between the first portion and the second portion.

7. The apparatus of claim 6, wherein the angular position identification layer includes a first angular position identification layer and a second angular position identification layer spaced apart from each other and having respective maximum widths at different respective angular positions, and wherein the first sensing inductor includes a plurality of first sensing inductors.

8. The apparatus of claim 1, further comprising:
a substrate on which the first and second reactance elements are disposed.

9. The apparatus of claim 8, further comprising:
an integrated circuit disposed on the substrate and electrically connected to the first and second reactance elements.

10. An electronic device, comprising:
the apparatus of claim 1;
the rotor; and
a body connected to the rotor.

11. The electronic device of claim 10, wherein the electronic device comprises a wearable electronic device, and the body is at least a portion of the wearable electronic device.

12. An apparatus with rotor input detection, the apparatus comprising:
a first reactance element disposed at a rotor configured such that at least a part of the rotor rotates around a rotation axis, and disposed at the rotor such that reactance of the first reactance element varies depending on relative rotation between a first portion of the rotor and a second portion of the rotor;
a second reactance element disposed at the rotor such that reactance of the second reactance element varies depending on a contact or a force applied to a side surface of the rotor; and
a second resonance circuit capacitor disposed at the rotor,
wherein the first and second reactance elements are configured to detect inputs of different areas of the rotor, and
wherein the second reactance element includes a second sensing inductor configured such that inductance of the second sensing inductor varies depending on the force applied to the side surface of the rotor to form resonance together with the second resonance circuit capacitor.

13. The apparatus of claim 12, wherein the second resonance circuit capacitor is configured such that capacitance of the second resonance circuit capacitor varies depending on a contact applied to an area overlapping the second sensing inductor on the side surface of the rotor.

14. An apparatus with rotor input detection, the apparatus comprising:
a sensing inductor disposed at a rotor configured such that at least a part of the rotor rotates around a rotation axis, and disposed at the rotor such that inductance of the sensing inductor varies depending on a force applied to a side surface of the rotor;
a resonance circuit capacitor configured to form resonance together with the sensing inductor depending on the inductance of the sensing inductor;
a resonance circuit inductor; and
a sensing capacitor disposed at the rotor such that capacitance of the sensing capacitor varies depending on a contact applied to the side surface of the rotor to form resonance together with the resonance circuit inductor,
wherein the sensing inductor and the sensing capacitor are configured to detect inputs of different areas of the side surface of the rotor.

15. The apparatus of claim 14, further comprising:
a substrate; and
an integrated circuit disposed on the substrate and electrically connected to the sensing inductor, the sensing circuit capacitor, the resonance circuit inductor, and the sensing capacitor.

16. The apparatus of claim 14, further comprising:
an additional sensing capacitor configured such that capacitance of the additional sensing capacitor varies depending a contact applied to an area overlapping the sensing inductor on the side surface of the rotor.

17. The apparatus of claim 14, wherein an angular position of an area overlapping the sensing inductor on the side surface of the rotor and an angular position of a portion overlapping the sensing capacitor in the side surface of the rotor are different from each other.

18. An electronic device, comprising:
the apparatus of claim 14;
the rotor; and
a body connected to the rotor.

19. The electronic device of claim 18, wherein the electronic device comprises a wearable electronic device, and the body is at least a portion of the wearable electronic device.

* * * * *